United States Patent
Tsai

(10) Patent No.: US 8,094,348 B2
(45) Date of Patent: Jan. 10, 2012

(54) DUPLEX DOCUMENT SCANNING APPARATUS AND METHOD THEREOF

(75) Inventor: Mi-lai Tsai, Keelung (TW)

(73) Assignee: Genesys Logic, Inc., Shindian (TW)

( * ) Notice: Subject to any disclaimer, the term of this patent is extended or adjusted under 35 U.S.C. 154(b) by 555 days.

(21) Appl. No.: 12/407,650

(22) Filed: Mar. 19, 2009

(65) Prior Publication Data

US 2010/0123939 A1      May 20, 2010

(30) Foreign Application Priority Data

Nov. 14, 2008   (TW) .............................. 97144203 A

(51) Int. Cl.
*H04N 1/04* (2006.01)

(52) U.S. Cl. ......... 358/474; 358/496; 358/498; 358/471

(58) Field of Classification Search .................. 358/474, 358/496, 498, 471, 484, 505
See application file for complete search history.

(56) References Cited

U.S. PATENT DOCUMENTS

| 5,038,182 | A | * | 8/1991 | Tanimoto | 399/374 |
| 5,412,485 | A | * | 5/1995 | Kashiwagi | 358/441 |
| 7,652,801 | B2 | * | 1/2010 | Haas et al. | 358/474 |

* cited by examiner

*Primary Examiner* — Houshang Safaipour
(74) *Attorney, Agent, or Firm* — Kirton & McConkie; Evan R. Witt

(57) ABSTRACT

A duplex document scanning apparatus and method thereof are described. The duplex document scanning apparatus includes a first image sensor, a second image sensor, a switch module, a data conversion unit, and a scanning control device. The first image sensor senses the first analog image signal and the second image sensor senses the second analog image signal. The switch module switches the first image sensor and the second image sensor to select the first analog image signal and the second analog image signal. The data conversion unit converts the first and second analog image signals to generate first and second digital image signals. The switch control module of scanning control device generates a switch signal to control the switch module. The scanning control device has a switch control unit and processes the first digital image signal and a second digital image signal. The switch control unit generates a switch signal for controlling the switch module and the switch module simultaneously outputs the first analog image signal and the second analog image signal to the data conversion unit during a signal period of the switch signal.

19 Claims, 6 Drawing Sheets

DUPLEX DOCUMENT SCANNING APPARATUS AND METHOD THEREOF

FIELD OF THE INVENTION

The present invention relates to a scanner and method thereof, and more particularly relates to a duplex document scanning apparatus and method thereof.

BACKGROUND OF THE INVENTION

With the rapid development of information technology, electrical document are widely used. For the purpose of storage, processing and delivery via internet network of the documents, it is necessary to scan the paper document into the format of electrical documents. However, to rapidly scan the document, there is a need to perform duplex scan (i.e. dual-side scanning) of the document.

FIG. 1 is a schematic block diagram of a conventional document scanner. The document scanner 100 only utilizes one charge coupled device (CCD) or one contact image sensor (CIS), and one analog front-end (AFE) unit. The document scanner 100 includes an image sensor 102, an analog front-end (AFE) unit 104, a scanning controller 106, and image memory 108. The scanning controller 106 further includes an image processor 110 and a timing generator 112. The image sensor 102 merely senses the image data in one-side of the paper document. The analog front-end (AFE) unit 104 converts the analog image data from the image sensor 102 into digital image data. The image processor 110 processes the digital image data and stores the processed digital image data in the image memory 108. The timing generator 112 controls the sensing timing of the image sensor 102 to generate the analog image data. Since the document scanner 100 only supports one analog front-end (AFE) unit and lack of dual CCDs or CISs, the document scanner 100 cannot perform duplex scanning.

FIG. 2 is a schematic block diagram of another conventional document scanner 200. The document scanner 200 only utilizes two charge coupled devices (CCDs) or two contact image sensors (CISs), and two analog front-end (AFE) units. The document scanner 200 includes two image sensors 202, two analog front-end (AFE) units 204, a scanning controller 206, and image memory 208. The scanning controller 206 further includes an image processor 210 and a timing generator 212. The front-side and back-side image sensors 202 sense the image data in the front-side and back-side of the paper document, respectively. The two analog front-end (AFE) units 204 convert the analog image data from the image sensors 202 into digital image data. The image processor 210 processes the digital image data and stores the processed digital image data in the image memory 208. The timing generator 212 controls the sensing timing of the image sensor 202 to generate the analog image data. Although the document scanner 200 supports dual-side scanning, however, two analog front-end (AFE) units need to be employed, thereby resulting in no cost-effectiveness. Moreover, the two analog front-end (AFE) units only output the digital image data sequentially and thus reduces the scanning speed of the document scanner 200. Consequently, there is a need to develop a novel scanner to solve the aforementioned problem.

SUMMARY OF THE INVENTION

One objective of the present invention is to provide a duplex document scanning apparatus and method thereof for rapidly scanning the document and save the manufacturing cost of the scanning apparatus.

According to the above objective, the present invention sets forth a duplex document scanning apparatus and method thereof. The duplex document scanning apparatus includes a first image sensor, a second image sensor, a switch module, a data conversion unit, a scanning control device and an image storage device. The scanning control device includes a scanning control device, a first timing generator, a second timing generator, an image processing module and a data compression module.

The first image sensor senses the data on the front-side of the document and outputs a first analog image signal corresponding to the data on the back-side. The second image sensor senses the data on the back-side of the document and outputs a second analog image signal corresponding to the data on the back-side. The switch module switches the first image sensor and the second image sensor for selecting either the first analog image signal (D1) or the second analog image signal (D2). The data conversion unit converts the first analog image signal and the second analog image signal to generate a first digital image signal and a second digital image signal correspondingly. The scanning control device processes the first digital image signal and a second digital image signal. The switch control unit generates a switch signal for controlling the switch module and the switch module simultaneously outputs the first analog image signal and the second analog image signal to the data conversion unit during a signal period of the switch signal.

The method of the present invention includes the steps of:

(a) The first image sensor senses the data on the front-side of the document and outputting a first analog image signal corresponding to the data on the front-side.

(b) The second image sensor senses the data on the back-side of the document and outputting a second analog image signal corresponding to the data on the back-side.

(c) The scanning control device generates a switch signal for controlling a switch module to switch the first image sensor and the second image sensor for selecting either the first analog image signal or the second analog image signal.

(d) The switch module simultaneously outputs the first analog image signal and the second analog image signal during a signal period of the switch signal. The first analog image signal comprises a plurality of first scan lines and the second analog image signal comprises a plurality of second scan lines, and the signal period of the switch signal corresponds to the first scan lines and the second scan lines. The first analog image signal comprises a plurality of first scan pixels and the second analog image signal comprises a plurality of second scan pixels, and the signal period of the switch signal corresponds to the first scan pixels and the second scan pixels.

(e) The data conversion unit converts the first analog image signal and the second analog image signal to generate a first digital image signal and a second digital image signal correspondingly.

(f) The scanning control device processes the first digital image signal and a second digital image signal for generating image data associated with the front-side and the back-side of the document.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
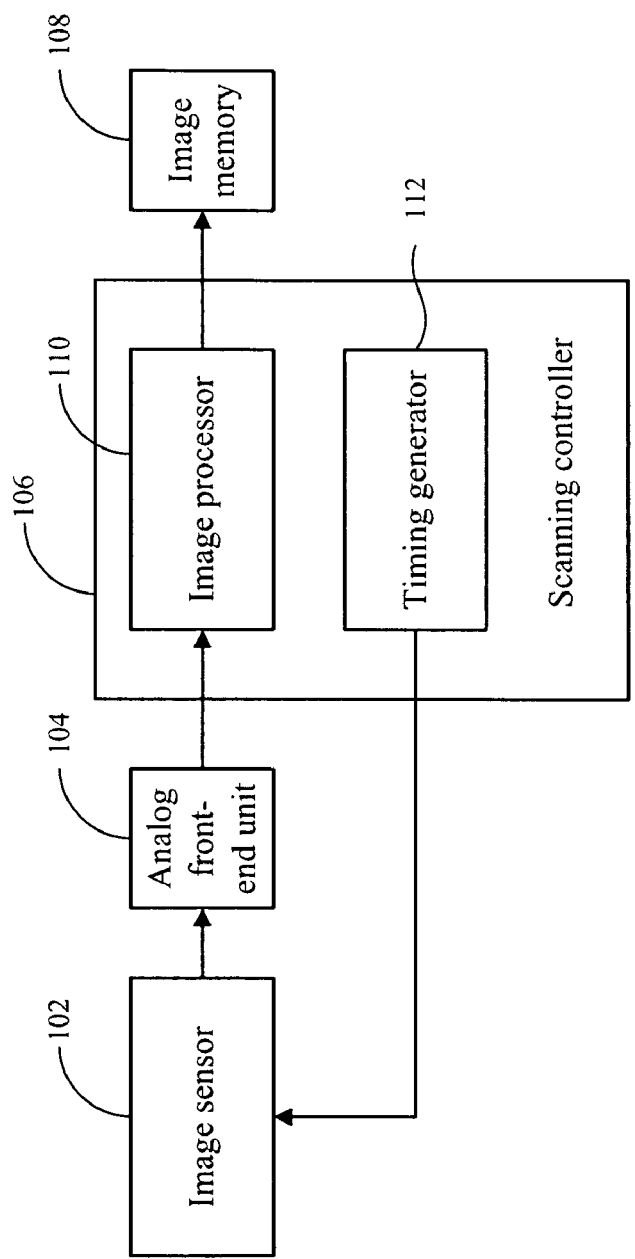
FIG. 1 is a schematic block diagram of a conventional document scanner.
Figure 2:
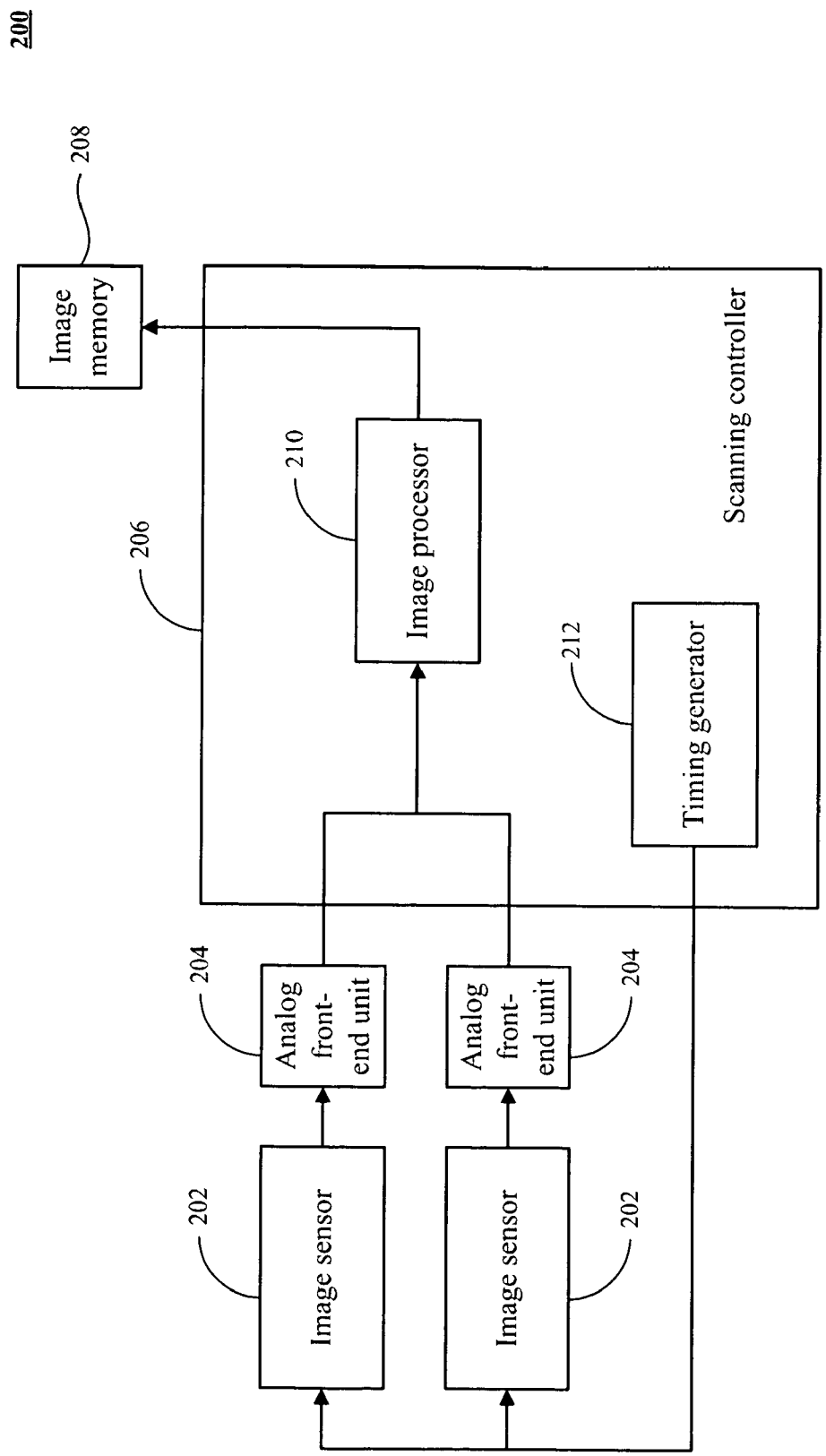
FIG. 2 is a schematic block diagram of another conventional document scanner.
Figure 3:
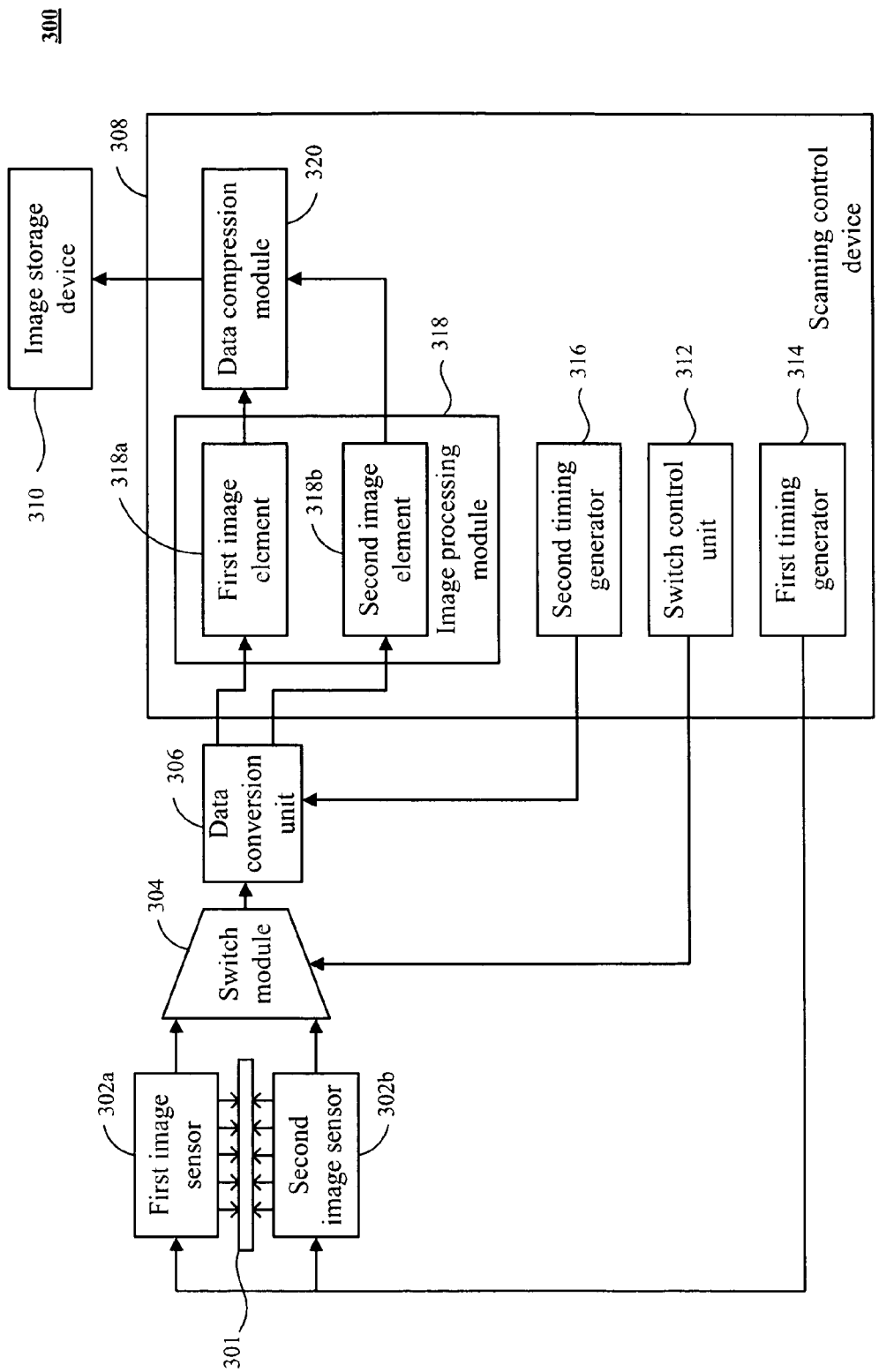
FIG. 3 is a schematic block diagram of a duplex document scanning apparatus according to one embodiment of the present invention.

FIG. 3 is a schematic block diagram of a duplex document scanning apparatus 300 according to one embodiment of the present invention. The duplex document scanning apparatus 300 simultaneously scans the data on a front-side and a back-side of a document 301. The duplex document scanning apparatus 300 includes a first image sensor 302a, a second image sensor 302b, a switch module 304, a data conversion unit 306, a scanning control device 308 and an image storage device 310. The switch module 304 couples the first image sensor 302a and the second image sensor 302b respectively to the data conversion unit 306. The scanning control device 308 couples the data conversion unit 306 to the image storage device 310.

The scanning control device 308 includes a scanning control device 312, a first timing generator 314, a second timing generator 316, an image processing module 318 and a data compression module 320. The scanning control device 312 is coupled to the switch module 304. The timing generator 314 is coupled to the first image sensor 302a and the second image sensor 302b, respectively. The second timing generator 316 is coupled to the data conversion unit 306. The image processing module 318 of the scanning control device 308 is coupled to the image storage device 310 of the duplex document scanning apparatus 300 via the data compression module 320. The first image element 318a and the second image element 318b of the image processing module 318 couples the data conversion unit 306 to the data compression module 320.

In one embodiment, the first image sensor 302a and the second image sensor 302b are a charge coupled device (CCD) or a contact image sensor (CIS). The switch module 304 is a multiplexer, an analog switch device, and/or a digital switch device. The data conversion unit 306 is an analog front-end (AFE) unit and the analog front-end (AFE) unit is composed of a digital-analog converter (DAC), an analog-digital converter (ADC), an operational amplifier (OAMP) and the combinations thereof.

Figure 4:
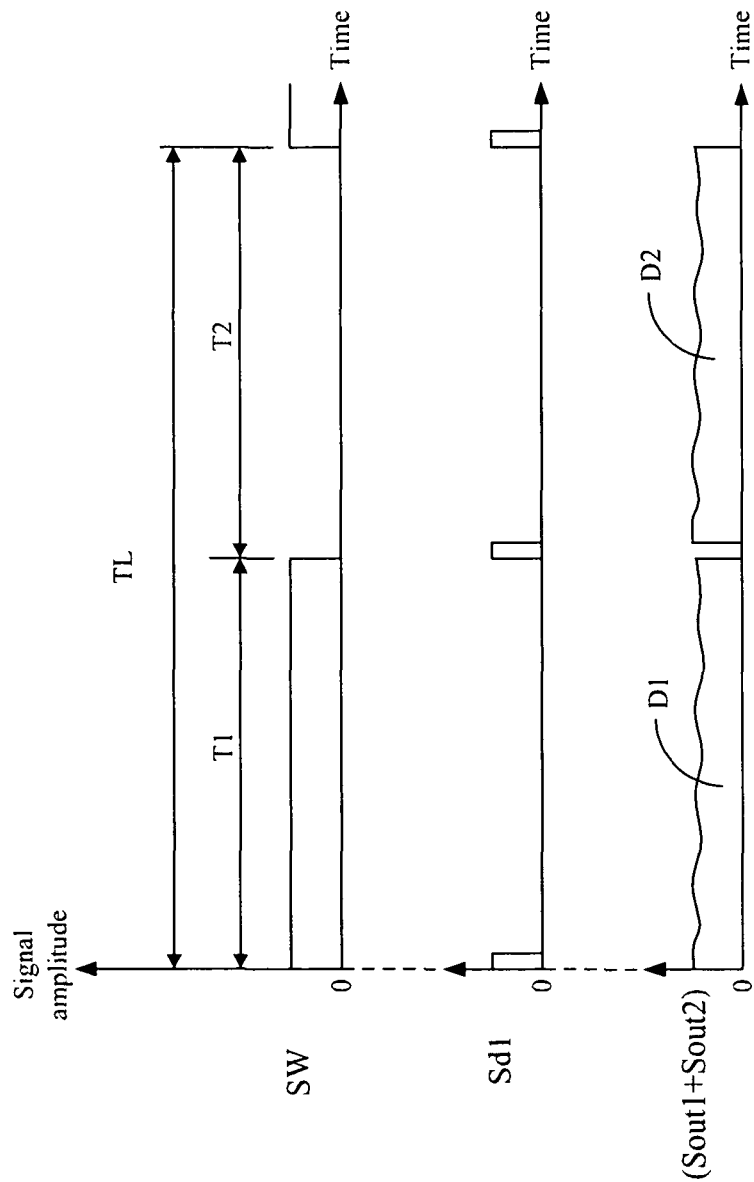
FIG. 4 is a schematic timing waveform of scanning the front-side and back-side of the document at a line-switch-based scanning mode according to the first embodiment of the present invention.

The first image sensor 302a senses the data on the front-side of the document 301 and outputs a first analog image signal corresponding to the data on the front-side. The second image sensor 302b senses the data on the back-side of the document 301 and outputs a second analog image signal corresponding to the data on the back-side. The switch module 304 switches the first image sensor 302a and the second image sensor 302b for selecting either the first analog image signal (D1) or the second analog image signal (D2), as shown in FIG. 4. The data conversion unit 306 converts the first analog image signal and the second analog image signal to generate a first digital image signal and a second digital image signal correspondingly. In one embodiment, the data conversion unit 306 performs a correlated double sampling (CDS) step, sample and hold (S/H) step, programmable gain adjustment, and offset adjustment of the image data. The scanning control device 308 processes the first digital image signal and a second digital image signal. The switch control unit 312 generates a switch signal for controlling the switch module 304 and the switch module 304 simultaneously outputs the first analog image signal and the second analog image signal to the data conversion unit 306 during a signal period (TL) of the switch signal.

The image processing module 318 processes the first digital image data and the second digital data from the data conversion unit 306. In one embodiment of the present invention, a first image element 318a and a second image element 318b processes the first digital image data and the second digital data respectively, as shown in FIG. 3. Alternatively, the image processing module 318 utilizes one image element to process the first digital image data and the second digital data. The processed digital image data are then packed and compressed by the data compression module 320 and stored into the image storage device 310. In another embodiment, the uncompressed digital image data are directly stored in the image storage device 310.

The scanning control device 308 further includes a first timing generator 314 and a second timing generator 316. As shown in FIG. 3, the first timing generator 314 generates a first timing signal (Sd1) to drive the first image sensor 302a and the second image sensor 302b. The second timing generator 316 generates a second timing signal (Sd2) to drive the data conversion unit 306. In one embodiment, the first image sensor 302a and the second image sensor 302b use the same timing generator, i.e. first timing generator 314. In another embodiment, the first image sensor 302a and the second image sensor 302b use two timing generators, respectively.

Please refer to FIG. 3 and FIG. 4. FIG. 4 is a schematic timing waveform of scanning the front-side and back-side of the document 301 at a line-switch-based scanning mode according to the first embodiment of the present invention. The timing waveform includes a switch signal (SW), a first timing signal (Sd1) and a combined signal (Sout1+Sout2) of a first analog image signal (Sout1) and a second analog image signal (Sout2). In the timing waveform, the horizontal axis represents time and the vertical axis represents amplitude of the signal. During the line-switch-based scanning mode, the first analog image signal (Sout1) of the first image sensor 302a is composed of a plurality of first scan lines (D1) and the second analog image signal (Sout2) of the second image sensor 302b is composed of a plurality of second scan lines (D2) in the combined signal (Sout1+Sout2). In one embodiment, the data of the first scan lines (D1) and the second scan lines (D2) are represented as high level (e.g. positive voltage level). In another embodiment, the data of the first scan lines (D1) and the second scan lines (D2) are represented as low level (e.g. negative voltage level).

The signal periods (TLs) in the switch signal (SW) corresponds to the first scan lines and the second scan lines. That is, during each signal period (TL) of the switch signal, the switch module 304 simultaneously outputs a first scan line (D1) and a second scan line (D2). During the signal period (TL) of the switch signal (SW), the second timing generator 316 drives the data conversion unit 306 so that the data conversion unit 306 simultaneously converts the first analog image signal (Sout1) and the second analog image signal (Sout2) to generate a first digital image signal and a second digital image signal. In other words, during each signal period (TL) of the switch signal (SW), the data conversion unit 306 simultaneously converts one first scan line (D1) and one second scan line (D2). Moreover, during each signal period (TL) of the switch signal (SW), the duration ratios of periods (T1, T2) which the data conversion unit 306 processes the first scan line (D1) and the second scan line (D2) are the same or different.

In one embodiment, while the switch signal (SW) is at a high level (T1), the first timing generator 314 drives the first image sensor 302a for sensing the data on the front-side of the document 301. While the switch signal (SW) is at a low level (T2), the first timing generator 314 drives the second image sensor 302b for sensing the data on the back-side of the document 301. Alternatively, while the switch signal (SW) is at a low level (T1), the first timing generator 314 drives the first image sensor 302a for sensing the data on the front-side of the document 301. While the switch signal (SW) is at a high level (T2), the first timing generator 314 drives the second image sensor 302b for sensing the data on the back-side of the document 301. Person skilled in the art should be noted that the first timing signal (Sd1), e.g. pulse signal, is located at either the rising edge or falling edge of the switch signal (SW). In one case, the edge of the first timing signal (Sd1) is approximately aligned to the rising edge or falling edge of the switch signal (SW). In another case, the edge of the first timing signal (Sd1) is adjacent to the rising edge or falling edge of the switch signal (SW).

According to the above-mentioned descriptions, the duplex document scanning apparatus 300 of the present invention utilizes the switch module 304 to switch first image sensor 302a and the second image sensor 302b for switching the first analog image signal (Sout1) and the second analog image signal (Sout2) and for simultaneously outputting the data of the first scan line (D1) and the second scan line (D2) to the data conversion unit 306. Therefore, since two image sensors are used, the duplex document scanning apparatus 300 is capable of scanning the document rapidly. Further, because one data conversion unit 306 is employed, the manufacturing cost of the duplex document scanning apparatus 300 is saved.

Figure 5:
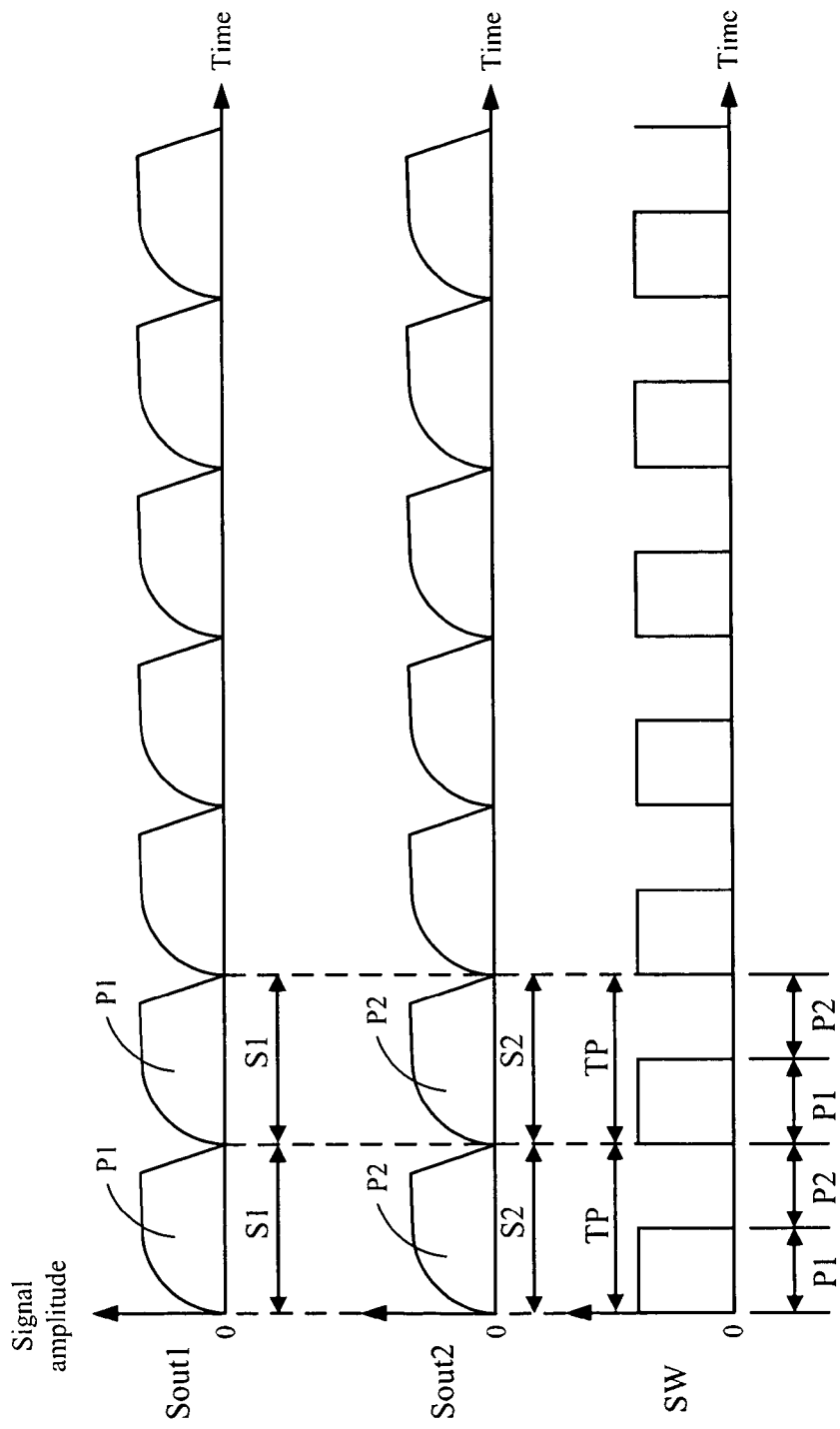
FIG. 5 is a schematic timing waveform of scanning the front-side and back-side of the document at a pixel-switch-based scanning mode according to the second embodiment of the present invention.

Please refer to FIG. 3 and FIG. 5. FIG. 5 is a schematic timing waveform of scanning the front-side and back-side of the document 301 at a pixel-switch-based scanning mode according to the second embodiment of the present invention. The timing waveform includes a switch signal (SW), a first analog image signal (Sout1) and a second analog image signal (Sout2). In the timing waveform, the horizontal axis represents time and the vertical axis represents amplitude of the signal. During the pixel-switch-based scanning mode, the first analog image signal (Sout1) of the first image sensor 302a is composed of a plurality of first scan pixels (P1) with period S1 and the second analog image signal (Sout2) of the second image sensor 302b is composed of a plurality of second scan pixels (P2) with period S2. In one embodiment, the data of the first scan pixels (P1) and the second scan pixels (P2) is represented as high level (e.g. positive voltage level). In another embodiment, the data of the first scan pixels (P1) and the second scan pixels (P2) is represented as low level (e.g. negative voltage level). The signal period (TP) of the switch signal (SW) corresponds to the period S1 of the first analog image signal (Sout1) and the period S2 of the second analog image signal (Sout2).

The signal periods (TPs) in the switch signal (SW) corresponds to the first scan pixels and the second scan pixels. That is, during each signal period (TP) of the switch signal (SW), the switch module 304 simultaneously outputs a first scan pixel (P1) and a second scan pixel (P2). During the signal period (TP) of the switch signal (SW), the second timing generator 316 drives the data conversion unit 306 so that the data conversion unit 306 simultaneously converts the first analog image signal (Sout1) and the second analog image signal (Sout2) to generate a first digital image signal and a second digital image signal. In other words, during each signal period (TP) of the switch signal (SW), the data conversion unit 306 simultaneously converts one first scan pixel (P1) and one second scan pixel (P2). Therefore, the data conversion unit 306 advantageously converts two pixels during one signal period (TP). Moreover, during each signal period (TP) of the switch signal (SW), the duration ratios of periods which the data conversion unit 306 processes the first scan pixel (P1) and the second scan pixel (P2) are the same or different.

In one embodiment, while the switch signal (SW) is at a high level during each signal period (TP) of the switch signal (SW), the switch module 304 switches the first analog image signal (Sout1) to the data conversion unit 306 and converts the first scan pixel (P1). While the switch signal (SW) is at a low level during each signal period (TP) of the switch signal (SW), the switch module 304 switches the second analog image signal (Sout2) to the data conversion unit 306 and converts the second scan pixel (P2). Alternatively, while the switch signal (SW) is at a low level during each signal period (TP) of the switch signal (SW), the switch module 304 switches the first analog image signal (Sout1) to the data conversion unit 306 and converts the first scan pixel (P1). While the switch signal (SW) is at a high level during each signal period (TP) of the switch signal (SW), the switch module 304 switches the second analog image signal (Sout2) to the data conversion unit 306 and converts the second scan pixel (P2).

According to the above-mentioned descriptions, the duplex document scanning apparatus 300 of the present invention utilizes the switch module 304 to switch first image sensor 302a and the second image sensor 302b for switching the first analog image signal (Sout1) and the second analog image signal (Sout2) and for simultaneously outputting the data of the first scan pixel (P1) and the second scan pixel (P2) to the data conversion unit 306. Therefore, since two image sensors are used, the duplex document scanning apparatus 300 is capable of scanning the document rapidly. Further, because one data conversion unit 306 is employed, the manufacturing cost of the duplex document scanning apparatus 300 is saved.

Figure 6:
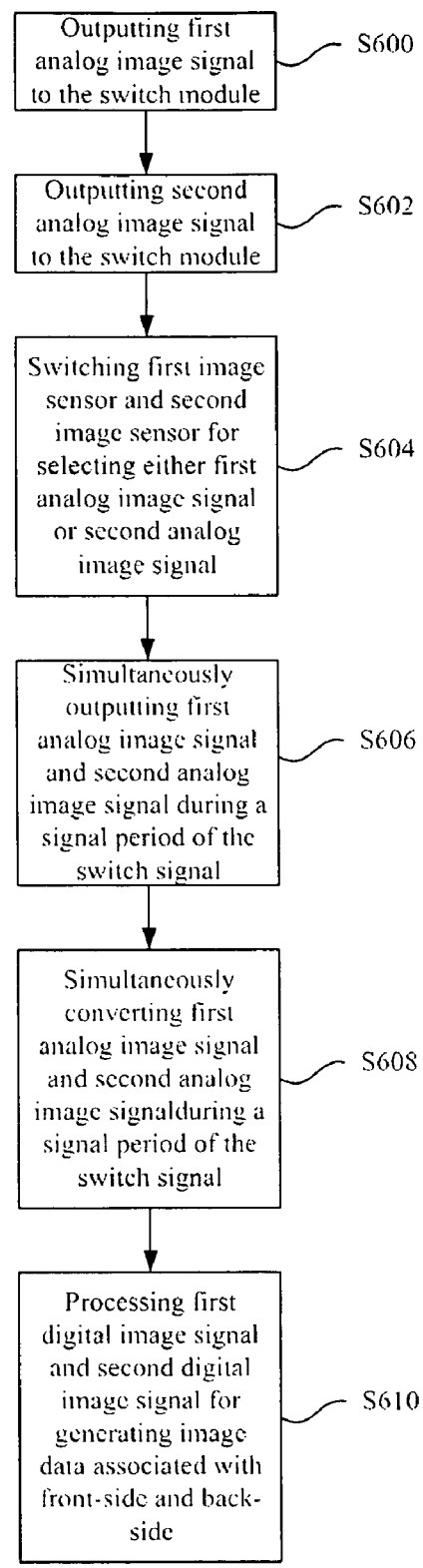
FIG. 6 is a flow chart of performing duplex document scanning method according to one embodiment of the present invention.

Please refer to FIG. 3 and FIG. 6. FIG. 6 is a flow chart of performing duplex document scanning method by a duplex document scanning apparatus 300 according to one embodiment of the present invention. The duplex document scanning apparatus 300 includes a first image sensor 302a, a second image sensor 302b, a switch module 304, a data conversion unit 306, a scanning control device 308 and an image storage device 310. The scanning control device 308 includes a scanning control device 312, a first timing generator 314, a second timing generator 316, an image processing module 318 and a data compression module 320. The method comprises the following steps:

In step S600, the first image sensor 302a senses the data on the front-side of the document and outputting a first analog image signal corresponding to the data on the front-side.

In step S602, the second image sensor 302b senses the data on the back-side of the document and outputting a second analog image signal corresponding to the data on the back-side. In one embodiment, the first timing generator 314 generates a first timing signal (Sd1) to drive the first image sensor 302a and the second image sensor 302b. When the signal period of the switch signal (SW) is at a high level, the first timing generator 314 drives the first image sensor 302a for sensing the data on the front-side of the document 301. When the signal period of the switch signal (SW) is at a low level, the first timing generator 314 drives the second image sensor 302b for sensing the data on the back-side of the document 301.

In step S604, the scanning control device 312 generates a switch signal for controlling a switch module to switch the first image sensor 302a and the second image sensor 302b for selecting either the first analog image signal or the second analog image signal.

In step S606, the switch module 304 simultaneously outputs the first analog image signal and the second analog image signal during a signal period of the switch signal. In one case, the first analog image signal comprises a plurality of first scan lines and the second analog image signal comprises a plurality of second scan lines, and the signal periods of the switch signal corresponds to the first scan lines and the second scan lines. In another case, the first analog image signal comprises a plurality of first scan pixels and the second analog image signal comprises a plurality of second scan pixels, and the signal periods of the switch signal corresponds to the first scan pixels and the second scan pixels.

In step S608, the data conversion unit 306 simultaneously converts the first analog image signal and the second analog image signal to generate a first digital image signal and a second digital image signal correspondingly. In one embodiment, the second timing generator 316 generates a second timing signal (Sd2) to drive the data conversion unit 306. During the signal period of the switch signal (SW) of switch control unit 312, the second timing generator 316 drives the data conversion unit 306 so that the data conversion unit 306 simultaneously converts the first analog image signal (Sout1) and the second analog image signal (Sout2) to generate a first digital image signal and a second digital image signal.

In step S610, the scanning control device 308 processes the first digital image signal and a second digital image signal for generating image data associated with the front-side and the back-side of the document.

According to the above-mentioned descriptions, the duplex document scanning apparatus 300 of the present invention utilizes the switch module 304 to switch first image sensor 302a and the second image sensor 302b for switching the first analog image signal (Sout1) and the second analog image signal (Sout2) and for simultaneously outputting the data of the first scan line (D1) and the second scan line (D2) to the data conversion unit 306. Therefore, since two image sensors are used, the duplex document scanning apparatus 300 is capable of scanning the document rapidly. Further, because one data conversion unit 306 is employed, the manufacturing cost of the duplex document scanning apparatus 300 is saved.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A duplex document scanning apparatus for scanning data on a front-side and a back-side of a document, the duplex document scanning apparatus comprising:
   a first image sensor, for sensing the data on the front-side of the document and outputting a first analog image signal corresponding to the data on the front-side;
   a second image sensor, for sensing the data on the back-side of the document and outputting a second analog image signal corresponding to the data on the back-side;
   a switch module, for switching the first image sensor and the second image sensor for selecting either the first analog image signal or the second analog image signal;
   a data conversion unit coupled to the switch module, for converting the first analog image signal and the second analog image signal to generate a first digital image signal and a second digital image signal correspondingly; and
   a scanning control device coupled to the first image sensor, the second image sensor, the switch module and the data conversion unit, respectively and having a switch control unit, for processing the first digital image signal and a second digital image signal, wherein the switch control unit generates a switch signal for controlling the switch module and the switch module simultaneously outputs the first analog image signal and the second analog image signal during a signal period of the switch signal.

2. The duplex document scanning apparatus of claim 1, wherein the first image sensor is a charge coupled device (CCD) or a contact image sensor (CIS).

3. The duplex document scanning apparatus of claim 1, wherein the second image sensor is a charge coupled device (CCD) or a contact image sensor (CIS).

4. The duplex document scanning apparatus of claim 1, wherein the switch module is a multiplexer.

5. The duplex document scanning apparatus of claim 1, wherein the data conversion unit is an analog front-end (AFE) unit.

6. The duplex document scanning apparatus of claim 1, wherein the scanning control device further comprises:
   a first timing generator, for generating a first timing signal to drive the first image sensor and the second image sensor; and
   a second timing generator, for generating a second timing signal to drive the data conversion unit.

7. The duplex document scanning apparatus of claim 6, wherein when the signal period of the switch signal is at a high level, the first timing generator drives the first image sensor.

8. The duplex document scanning apparatus of claim 7, wherein when the signal period of the switch signal is at a low level, the first timing generator drives the second image sensor.

9. The duplex document scanning apparatus of claim 6, wherein during the signal period of the switch signal, the second timing generator drives the data conversion unit to allow the data conversion unit to convert the first analog image signal and the second analog image signal into the first digital image signal and the second digital image signal, respectively.

10. The duplex document scanning apparatus of claim 1, wherein the first analog image signal comprises a plurality of first scan lines and the second analog image signal comprises a plurality of second scan lines, and the signal period of the switch signal corresponds to the first scan lines and the second scan lines.

11. The duplex document scanning apparatus of claim 1, wherein the first analog image signal comprises a plurality of first scan pixels and the second analog image signal comprises a plurality of second scan pixels, and the signal period of the switch signal corresponds to the first scan pixels and the second scan pixels.

12. A duplex document scanning method for scanning data on a front-side and a back-side of a document, the method comprising the steps of:
   (a) sensing the data on the front-side of the document and outputting a first analog image signal corresponding to the data on the front-side by a first image sensor by a first image sensor;
   (b) sensing the data on the back-side of the document and outputting a second analog image signal corresponding to the data on the back-side by a second image sensor by a second image sensor;
   (c) generating a switch signal for controlling a switch module to switch the first image sensor and the second image sensor for selecting either the first analog image signal or the second analog image signal;
   (d) simultaneously outputting the first analog image signal and the second analog image signal by the switch module during a signal period of the switch signal;
   (e) converting the first analog image signal and the second analog image signal to generate a first digital image signal and a second digital image signal by a data conversion unit correspondingly; and
   (f) processing the first digital image signal and a second digital image signal for generating image data associated with the front-side and the back-side of the document.

13. The method of claim 12, during the steps (a) and (b), further comprising a step of generating a first timing signal by a first timing generator to drive the first image sensor and the second image sensor.

14. The method of claim 13, during the step (e), further comprising a step of generating a second timing signal by a second timing generator to drive the data conversion unit.

15. The method of claim 14, wherein when the signal period of the switch signal is at a high level, the first timing generator drives the first image sensor.

16. The method of claim 15, wherein when the signal period of the switch signal is at a low level, the first timing generator drives the second image sensor.

17. The method of claim 14, wherein during the signal period of the switch signal, the second timing generator drives the data conversion unit to allow the data conversion unit to convert the first analog image signal and the second analog image signal into the first digital image signal and the second digital image signal, respectively.

18. The method of claim 12, wherein the first analog image signal comprises a plurality of first scan lines and the second analog image signal comprises a plurality of second scan lines, and the signal period of the switch signal corresponds to the first scan lines and the second scan lines.

19. The method of claim 12, wherein the first analog image signal comprises a plurality of first scan pixels and the second analog image signal comprises a plurality of second scan pixels, and the signal period of the switch signal corresponds to the first scan pixels and the second scan pixels.

* * * * *